United States Patent
Nakao et al.

(10) Patent No.: US 8,780,303 B2
(45) Date of Patent: Jul. 15, 2014

(54) LIQUID CRYSTAL APPARATUS INCLUDING A DISPERSED LIQUID CRYSTAL AND AN ACTIVE MIRROR

(75) Inventors: Kenji Nakao, Kanazawa (JP); Akio Murayama, Fukaya (JP); Yasushi Kawata, Ageo (JP)

(73) Assignee: Japan Display Inc., Tokyo (JP)

( * ) Notice: Subject to any disclaimer, the term of this patent is extended or adjusted under 35 U.S.C. 154(b) by 6 days.

(21) Appl. No.: 13/297,765

(22) Filed: Nov. 16, 2011

(65) Prior Publication Data

US 2012/0127394 A1    May 24, 2012

(30) Foreign Application Priority Data

Nov. 18, 2010   (JP) ................................. 2010-257672

(51) Int. Cl.
*G02F 1/1335* (2006.01)
(52) U.S. Cl.
USPC .............................. 349/114; 349/86; 349/195
(58) Field of Classification Search
USPC ................... 349/76, 193–195, 113–115, 196, 349/77–83, 86–94
See application file for complete search history.

(56) References Cited

U.S. PATENT DOCUMENTS

| | | | |
|---|---|---|---|
| 6,437,900 B1* | 8/2002 | Cornelissen et al. | 359/246 |
| 2004/0100598 A1* | 5/2004 | Adachi et al. | 349/113 |
| 2005/0195344 A1* | 9/2005 | Chang et al. | 349/114 |
| 2008/0218657 A1* | 9/2008 | Hwang et al. | 349/62 |

FOREIGN PATENT DOCUMENTS

| | | |
|---|---|---|
| JP | 2001-318374 A | 11/2001 |
| JP | 2003-344835 A | 12/2003 |
| JP | 2004-317908 A | 11/2004 |
| JP | 2004-325907 | 11/2004 |
| JP | 2010-211084 A | 9/2010 |

OTHER PUBLICATIONS

Sawano, Yoshiaki, Display Device, Sep. 24, 2010, JPO, translation of JP2010-211084.*
Japanese Office Action Issued Oct. 16, 2012 in Patent Application No. 2010-257672 (with English translation).

* cited by examiner

*Primary Examiner* — Mark Robinson
*Assistant Examiner* — Zachary A Nemtzow
(74) *Attorney, Agent, or Firm* — Oblon, Spivak, McClelland, Maier & Neustadt, L.L.P.

(57) ABSTRACT

According to one embodiment, a liquid crystal apparatus includes a first liquid crystal panel including a pair of substrates, and a dispersed liquid crystal held between the pair of substrates, and an active mirror placed behind the first liquid crystal panel, and configured to switch a first state in which linearly polarized light whose polarizing direction is a second direction is transmitted, and a second state in which the linearly polarized light whose polarizing direction is the second direction is absorbed or reflected.

4 Claims, 3 Drawing Sheets

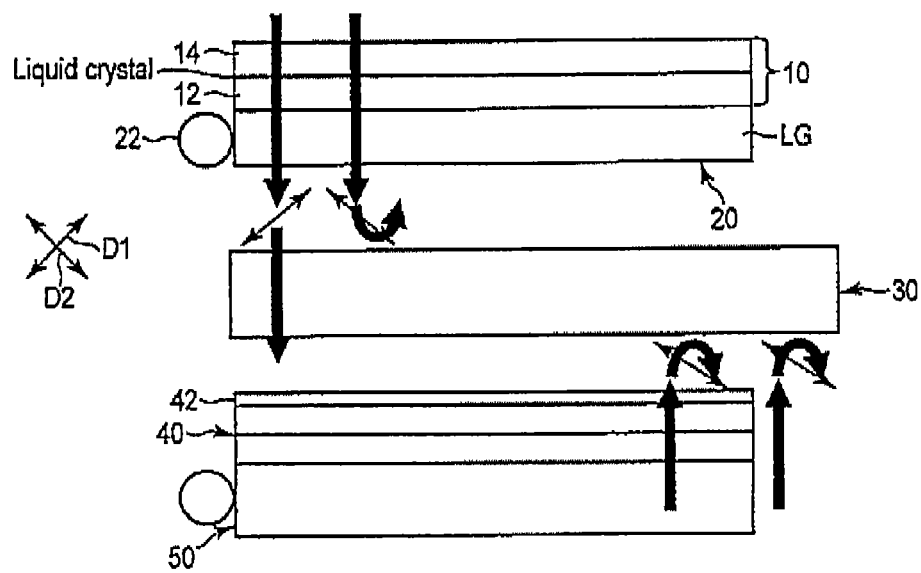
F I G. 1
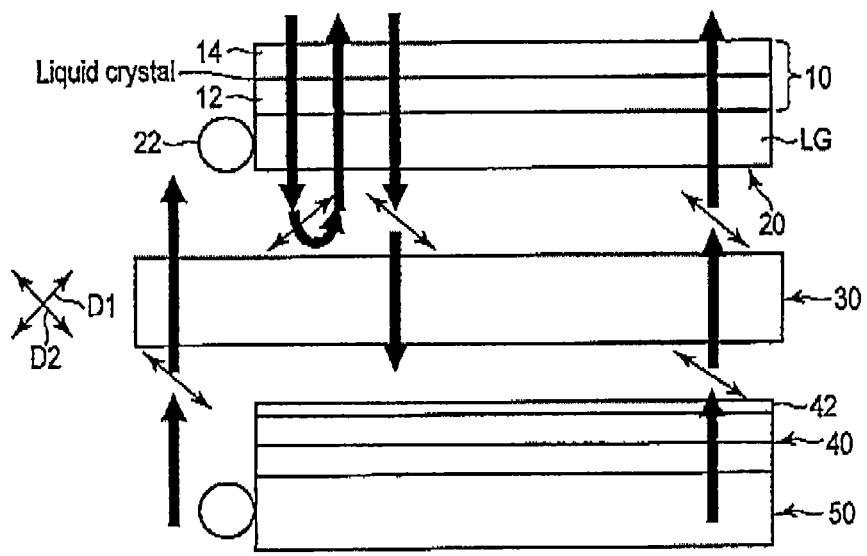
F I G. 2

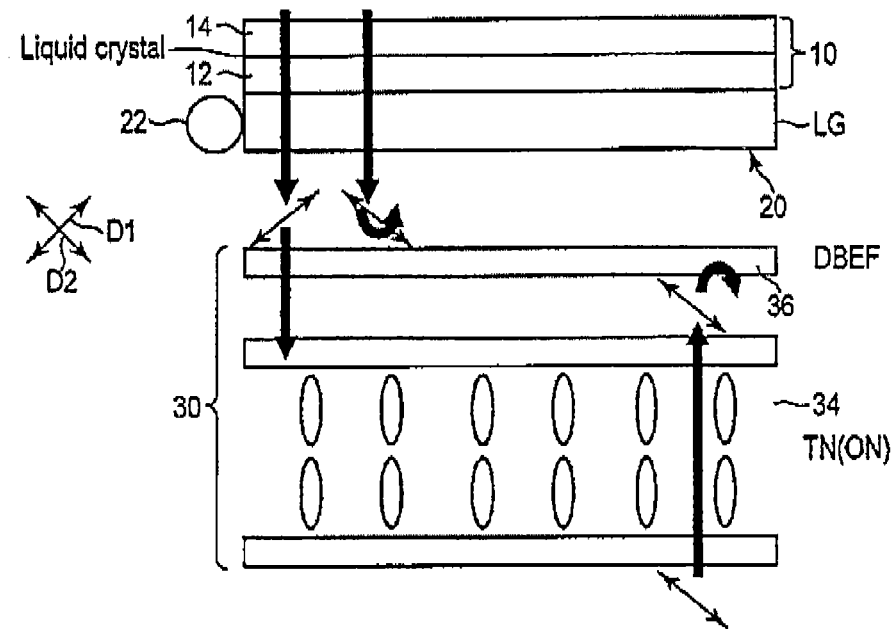
F I G. 5
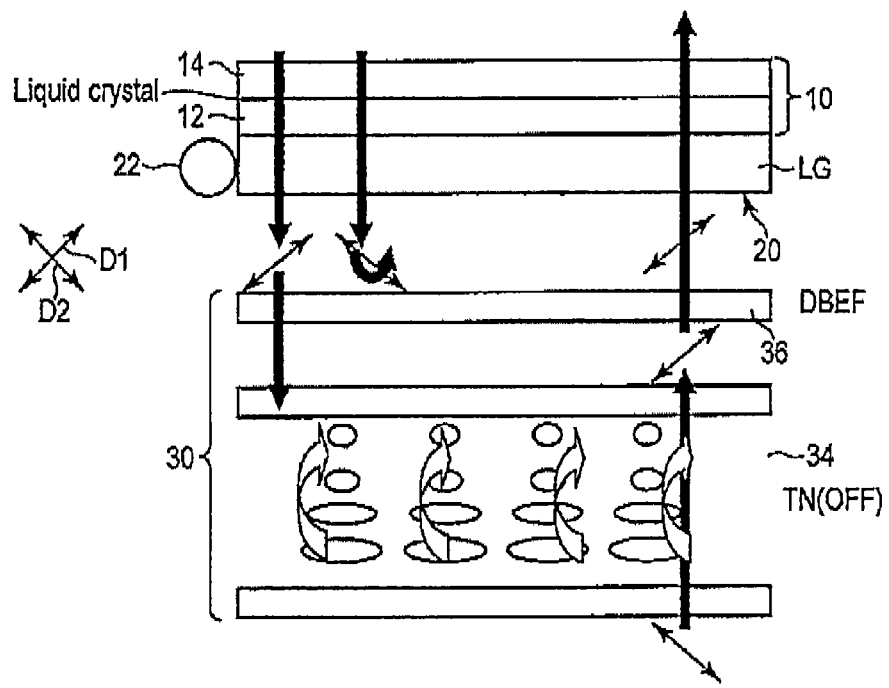
F I G. 6

LIQUID CRYSTAL APPARATUS INCLUDING A DISPERSED LIQUID CRYSTAL AND AN ACTIVE MIRROR

CROSS-REFERENCE TO RELATED APPLICATIONS

This application is based upon and claims the benefit of priority from prior Japanese Patent Application No. 2010-257672, filed Nov. 18, 2010, the entire contents of which are incorporated herein by reference.

FIELD

Embodiments described herein relate generally to a liquid crystal apparatus.

BACKGROUND

A liquid crystal apparatus has features such as a light weight, flatness, and low power consumption, and hence is widely used as a display device of, e.g., a personal computer, portable information terminal, television set, or car navigation system.

As liquid crystal apparatuses using polarizing plates, liquid crystal apparatuses having TN (Twisted Nematic), STN (Super Twisted Nematic), IPS (In-Plane Switching), VA (Vertically Aligned), and OCB (Optically Compensated Bend) modes have been proposed.

On the other hand, as liquid crystal apparatuses using no polarizing plate, liquid crystal apparatuses using dispersed liquid crystals have been proposed. An example of the dispersed liquid crystal is a PDLC (Polymer Dispersed Liquid Crystal).

BRIEF DESCRIPTION OF THE DRAWINGS

FIG. 1 is a view showing a configuration example when a liquid crystal apparatus according to the first embodiment is in a mirror mode;

FIG. 2 is a view showing a configuration example when the liquid crystal apparatus according to the first embodiment is in a transmitting mode;

FIG. 5 is a view showing a configuration example of an active mirror of a liquid crystal apparatus according to the second embodiment; and FIG. 6 is a view showing another configuration example of the active mirror of the liquid crystal apparatus according to the second embodiment.

DETAILED DESCRIPTION

Figure 3:
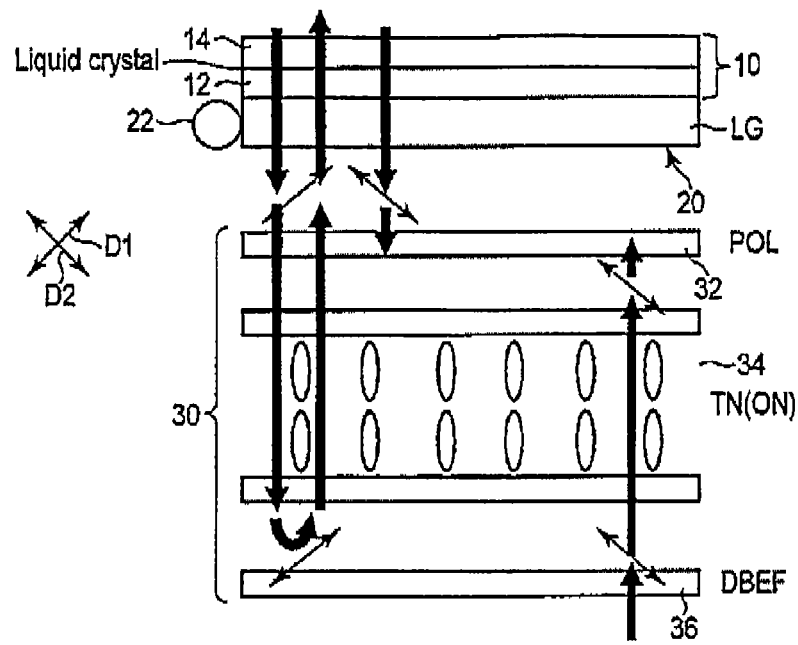
FIG. 3 is a view showing a configuration example of an active mirror of the liquid crystal apparatus shown in FIG. 1.

In general, according to one embodiment, a liquid crystal apparatus includes a first liquid crystal panel including a pair of substrates, and a dispersed liquid crystal sandwiched between the pair of substrates; and an active mirror placed behind the first liquid crystal panel, and configured to switch a first state in which linearly polarized light whose polarizing direction is a second direction is transmitted, and a second state in which the linearly polarized light whose polarizing direction is the second direction is absorbed or reflected.

A liquid crystal apparatus according to the first embodiment will be explained below with reference to the accompanying drawings.

FIG. 1 shows a configuration example of the liquid crystal apparatus according to the first embodiment. The liquid crystal apparatus according to this embodiment includes a dispersed liquid crystal panel 10, illuminating device 20, and active mirror 30.

The dispersed liquid crystal panel 10 is a liquid crystal panel using no polarizing plate, and includes a pair of electrode substrates (first and second substrates 12 and 14), and a dispersed liquid crystal sandwiched between the pair of electrode substrates. The dispersed liquid crystal is, e.g., a PDLC or PNLC (Polymer Network Liquid Crystal), and can switch a dispersed stated and transmitting state in accordance with a voltage applied to the liquid crystal. The dispersed liquid crystal is obtained by dispersing a liquid crystal in a polymer, and changes to the transmitting state when a voltage is applied.

The illuminating device 20 includes a light guide LG and light source 22. The light guide LG has an almost rectangular parallelepiped shape, and includes a light incident surface facing the light source 22, and a light exit surface facing the dispersed liquid crystal panel 10. The light guide LG guides light emitted from the light source toward the dispersed liquid crystal panel 10, and transmits light entering from the backside toward to the dispersed liquid crystal panel 10.

The illuminating device 20 can be omitted. When the light guide LG and dispersed liquid crystal panel 10 are arranged to face each other, a portion in a dispersed display state is displayed in white, and a portion in a transmitting display state can be transmitted. Note that it is desirable to increase the transmittance without forming any dispersed dot or prism cut on the light guide LG.

The active mirror 30 is placed behind the illuminating device 20, and can be switched between a transmitting state (first state) and reflecting state (second state).

FIG. 1 shows a configuration example when the active mirror 30 is in the reflecting state. When the active mirror 30 is set in the reflecting state, the display contrast of the dispersed liquid crystal panel 10 increases. In this example, a liquid crystal panel 40 and backlight 50 are arranged behind the active mirror 30.

The liquid crystal panel 40 is, e.g., an active matrix type liquid crystal panel including a display portion (not shown) in which display pixels are arranged in a matrix. A polarizing plate 42 is placed on that principal surface of the liquid crystal panel 40, which faces the active mirror 30. The polarizing plate 42 is set to transmit light whose polarizing direction is a second direction D2. When the active mirror 30 is in the transmitting state, light transmitted through the polarizing plate 42 is transmitted through the active mirror 30. When the active mirror 30 is in the reflecting state, light transmitted through the polarizing plate 42 is reflected by the active mirror 30.

The backlight 50 is set to illuminate the display portion of the liquid crystal panel 40.

FIG. 3 shows a configuration example of the active mirror 30 in the reflecting state. The active mirror 30 includes a polarizing plate 32 facing the illuminating device 20, an optical sheet 36, and a polarization conversion element 34 positioned between the polarizing plate 32 and optical sheet 36.

The polarizing plate 32 is set to transmit light whose polarizing direction is a first direction D1, and absorb light whose polarizing direction is the second direction D2. For example, light whose polarizing direction is the first direction D1 is an S wave, and light whose polarizing direction is the second direction D2 is a P wave.

The polarization conversion element 34 switches a λ/2 plate capable of converting linearly polarized light into another linearly polarized light, and a state with no optical modulation. The polarization conversion element 34 includes a pair of electrode substrates facing each other, and a TN mode liquid crystal layer as a light modulation layer held between the pair of electrode substrates. When the active mirror 30 is in the reflecting state, a voltage is applied to the TN mode liquid crystal.

In this embodiment, a voltage is evenly applied from the pair of electrode substrates to the TN mode liquid crystal. However, it is also possible to divide electrodes of the pair of electrode substrates into regions, and control the voltage to be applied to the TN mode liquid crystal for each region.

The optical sheet 36 is designed to transmit light whose polarizing direction is the second direction D2, and reflect light whose polarizing direction is the first direction D1 toward the incident side. For example, the DBEF manufactured by 3M can be used.

Of light entering the active mirror 30 through the dispersed liquid crystal panel 10, light whose polarizing direction is the first direction D1 is transmitted through the polarizing plate 32, and enters the polarization conversion element 34. Since the phase of the light having entered the polarization conversion element 34 remains unchanged, the light whose polarizing direction is the first direction D1 is output. The light output from the polarization conversion element 34 is returned toward the polarization conversion element 34 without being transmitted through the optical sheet 36. The light is then transmitted through the polarization conversion element 34 and polarizing plate 32 again, and output toward the dispersed liquid crystal panel 10.

Of light entering the active mirror 30 through the dispersed liquid crystal panel 10, light whose polarizing direction is the second direction D2 is absorbed by the polarizing plate 32.

The light whose polarizing direction is the second direction D2, which is transmitted through the polarizing plate 42 of the liquid crystal panel 40, is transmitted through the optical sheet 36, and enters the polarization conversion element 34. Since the phase of the light having entered the polarization conversion element 34 remains unchanged, the light whose polarizing direction is the second direction D2 is output. The polarizing plate 32 absorbs the light output from the polarization conversion element 34.

When the active mirror 30 is in the reflecting state as described above, the active mirror 30 does not transmit light entering from the backside (the side of the liquid crystal panel 40) of the active mirror 30. Accordingly, an object behind the active mirror 30 cannot be seen through it from the side of the dispersed liquid crystal panel 10. Also, a portion of light entering the active mirror 30 from the dispersed liquid crystal panel 10 is returned toward it. Therefore, the apparatus can be used as a reflecting type display device that illuminates the dispersed liquid crystal panel 10 by using external light.

FIG. 2 shows a configuration example when the active mirror 30 is in the transmitting state. When the active mirror 30 is set in the transmitting state, the liquid crystal panel 40 placed behind the dispersed liquid crystal panel 10 is seen through the active mirror 30, i.e., transparency can be produced. When the active mirror 30 is in the transmitting state, the active mirror 30 transmits light transmitted through the polarizing plate 42.

Figure 4:
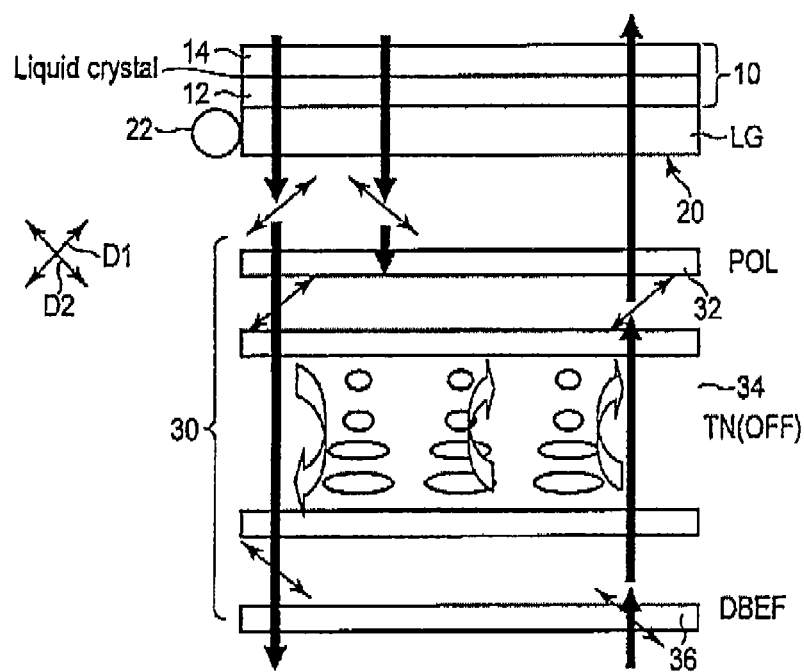
FIG. 4 is a view showing a configuration example of an active mirror of the liquid crystal apparatus shown in FIG. 2.

FIG. 4 shows a configuration example of the active mirror 30 in the transmitting state. When the active mirror 30 is in the transmitting state, no voltage is applied to the TN mode liquid crystal. Accordingly, the polarizing direction of polarized light transmitted through the polarization conversion element 34 is converted into a predetermined direction.

Of light entering the active mirror 30 through the dispersed liquid crystal panel 10, light whose polarizing direction is the first direction D1 is transmitted through the polarizing plate 32, and enters the polarization conversion element 34. Since the phase of the light having entered the polarization conversion element 34 changes, light whose polarizing direction is the second direction D2 is output. The light output from the polarization conversion element 34 is output to the backside of the active mirror 30 through the optical sheet 36.

Of light entering the active mirror 30 through the dispersed liquid crystal panel 10, light whose polarizing direction is the second direction D2 is absorbed by the polarizing plate 32.

Light whose polarizing direction is the second direction D2 transmitted through the polarizing plate 42 of the liquid crystal panel 40 is transmitted through the optical sheet 36, and enters the polarization conversion element 34. Since the polarizing direction of the light having entered the polarization conversion element 34 is converted, light whose polarizing direction is the first direction D1 is output. The light output from the polarization conversion element 34 is output toward the dispersed liquid crystal panel 10 through the polarizing plate 32.

When the active mirror 30 is in the transmitting state as described above, the active mirror 30 transmits light entering from the backside (the side of the liquid crystal panel 40) of the active mirror 30, so an object behind the active mirror 30 can be seen through it from the side of the dispersed liquid crystal panel 10.

Also, the active mirror 30 has the effect as described above for only the input of linearly polarized light. Accordingly, light must enter the active mirror 30 via the polarizing plate, so the brightness becomes half or less. However, when the liquid crystal panel 40 including the polarizing plate 42 is placed behind the active mirror 30, no more polarizing plate 42 need be placed behind the active mirror 30. This makes it possible to prevent the display from becoming darker.

Note that when the liquid crystal panel 40 is placed behind the active mirror 30, the active mirror 30 is set in accordance with the polarizing direction of light output from the polarizing plate 42 of the liquid crystal panel 40. That is, the active mirror 30 and liquid crystal panel 40 are aligned so that the polarizing direction of light transmitted through the optical sheet 36 matches that of light transmitted through the polarizing plate 42.

In the liquid crystal apparatus according to this embodiment as described above, it is possible to switch whether to place the liquid crystal panel 40 (LCD) behind the dispersed liquid crystal panel 10, or place the mirror behind the dispersed liquid crystal panel 10.

When no voltage is applied to the polarization conversion element 34, an image displayed on the liquid crystal panel 40 can be seen through the dispersed liquid crystal panel 10. Although the liquid crystal panel 40 is seen through the dispersed liquid crystal panel 10, the apparatus can be used without any unnaturalness because the transmittance of the dispersed liquid crystal panel 10 is 80% or more. It is also possible to superpose a cloudy display on an image displayed on the liquid crystal panel 40.

When a voltage is applied to the polarization conversion element 34, the active mirror 30 functions as a mirror, and an image can be displayed by increasing the contrast of the dispersed liquid crystal panel 10. Since the active mirror 30 absorbs light whose polarizing direction is the second direction D2 in this state, about 50% of light is absorbed, and the rest is reflected. That is, this state is intermediate between a state in which a black absorption band is placed behind the dispersed liquid crystal panel 10, and a state in which a mirror that reflects 100% of light is placed behind the dispersed liquid crystal panel 10.

As described above, this embodiment can provide a liquid crystal apparatus capable of implementing good display characteristics, and performing multilayered display.

A liquid crystal apparatus according to the second embodiment will be explained below with reference to the accompanying drawings. Note that in the following explanation, the same reference numerals as in the liquid crystal apparatus according to the above-described first embodiment denote the same parts, and a repetitive explanation will be omitted. The liquid crystal apparatus according to this embodiment differs from that of the first embodiment in the configuration of an active mirror 30.

FIG. 5 shows a configuration example when the active mirror 30 is in the reflecting state. In this example, a liquid crystal panel 40 and backlight 50 are arranged behind the active mirror 30.

The liquid crystal panel 40 includes a polarizing plate 42 facing the active mirror 30. The polarizing plate 42 is set to transmit light whose polarizing direction is a second direction D2, and absorb light whose polarizing direction is a first direction D1. When the active mirror 30 is in the reflecting state, the active mirror 30 reflects light transmitted through the polarizing plate 42.

The active mirror 30 includes an optical sheet 36 facing an illuminating device 20, and a polarization conversion element 34 positioned between the optical sheet 36 and liquid crystal panel 40.

Of light entering the active mirror 30 through a dispersed liquid crystal panel 10, light whose polarizing direction is the first direction D1 enters the polarization conversion element 34 through the optical sheet 36. The light having entered the polarization conversion element 34 is output toward the liquid crystal panel 40 while the phase of the light remains unchanged. The polarizing plate 42 of the liquid crystal panel 40 absorbs the output light whose polarizing direction is the first direction D1.

Of light entering the active mirror 30 through the dispersed liquid crystal panel 10, the optical sheet 36 reflects light whose polarizing direction is the second direction D2 toward the dispersed liquid crystal panel 10.

The polarizing plate 42 of the liquid crystal panel 40 transmits light whose polarizing direction is the second direction D2, and outputs the light toward the polarization conversion element 34. The light having entered the polarization conversion element 34 is output toward the optical sheet 36 while the phase of the light remains unchanged. The optical sheet 36 reflects, toward the polarization conversion element 34, the light whose polarizing direction is the second direction D2 output from the polarization conversion element 34.

When the active mirror 30 is in the reflecting state as described above, the active mirror 30 does not transmit light entering from the backside (the side of the liquid crystal panel 40) of the active mirror 30. Accordingly, an object behind the active mirror 30 cannot be seen from the side of the dispersed liquid crystal panel 10. Also, since a portion of light entering the active mirror 30 from the dispersed liquid crystal panel 10 is returned to it, the apparatus can be used as a reflecting type liquid crystal apparatus that illuminates the dispersed liquid crystal panel 10 by using external light. When the active mirror 30 is set in the reflecting state, the contrast between the dispersed state and transmitting state of the dispersed liquid crystal panel 10 increases.

FIG. 6 shows a configuration example when the active mirror 30 is in the transmitting state. When the active mirror 30 is in the transmitting state, the active mirror 30 transmits light transmitted through the polarizing plate 42.

Of light entering the active mirror 30 through the dispersed liquid crystal panel 10, light whose polarizing direction is the first direction D1 is transmitted through the optical sheet 36, and enters the polarization conversion element 34. Since the phase of the light having entered the polarization conversion element 34 changes, light whose polarizing direction is the second direction D2 is output. The light output from the polarization conversion element 34 is output toward the backside of the active mirror 30.

Of light entering the active mirror 30 through the dispersed liquid crystal panel 10, light whose polarizing direction is the second direction D2 is reflected by the optical sheet 36 toward the dispersed liquid crystal panel 10.

When the light whose polarizing direction is the second direction D2 transmitted through the polarizing plate 42 of the liquid crystal panel 40 enters the polarization conversion element 34, the phase changes, and light whose polarizing direction is the first direction D1 is output. The light output from the polarization conversion element 34 is output toward the dispersed liquid crystal panel 10 through the optical sheet 36.

When the active mirror 30 is in the transmitting state as described above, the active mirror 30 transmits light entering from the backside (the side of the liquid crystal panel 40) of the active mirror 30. Therefore, an object behind the active mirror 30 can be seen through it from the side of the dispersed liquid crystal panel 10.

Also, the active mirror 30 has the effect as described above for only the input of linearly polarized light. When the liquid crystal panel 40 is placed behind the active mirror 30, the active mirror 30 is set in accordance with the polarizing direction of light output from the polarizing plate 42 of the liquid crystal panel 40. In this embodiment, the active mirror 30 and liquid crystal panel 40 are aligned so that the polarizing direction of light transmitted through the optical sheet 36 and that of light transmitted through the polarizing plate 42 are different (by a rotational angle of 90°).

That is, this embodiment can provide a liquid crystal apparatus capable of implementing good display characteristics, and performing multilayered display.

Also, in this embodiment, a TN liquid crystal panel is placed as a polarization conversion element behind the optical sheet 36, and the polarizing plate 42 of the liquid crystal panel 40 is placed behind the TN liquid crystal panel. Since this makes the number of polarizing plates smaller by one than that of the first embodiment, the transmittance can be raised.

On the other hand, when the optical sheet 36 is set to face the backside of the dispersed liquid crystal panel 10, the optical sheet 36 reflects a portion of light having entered from the dispersed liquid crystal panel 10, even when the active mirror 30 is in the transmitting state. Therefore, when an image displayed on the liquid crystal panel 40 behind the active mirror 30 is seen while the active mirror 30 is in the transmitting state, reflected light is sometimes seen. Also, a purplish image may be displayed when the active mirror 30 is in the reflecting state.

Accordingly, it is desirable to adopt the arrangement of the liquid crystal apparatus according to this embodiment when the brightness is important, and the arrangement of the liquid crystal apparatus according to the first embodiment when the display quality such as the contrast is important.

Note that the feature of the above-mentioned embodiment is the combination of the dispersed liquid crystal and active mirror, so it is not essential to overlap liquid crystal displays to form multiple layers as has been described above. For example, it is also possible, by combining the dispersed liquid crystal and active mirror, to form a device that displays an image by the dispersed liquid crystal by switching a state in which an object behind the liquid crystal panel is seen through it, and a reflecting state in which an object behind the liquid crystal panel is not seen through it.

This device includes only the configurations shown in FIGS. 3, 4, 5, and 6. In this device, the polarizing plate 42 is added below the active mirror 30 shown in FIGS. 5 and 6.

Furthermore, the above-mentioned embodiment uses a TN mode liquid crystal panel as the polarization conversion element 34, but any means capable of converting the polarizing direction is usable. For example, a liquid crystal panel having another mode may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal apparatus comprising:
   a first liquid crystal panel including a pair of substrates, and a dispersed liquid crystal held between the pair of substrates;
   an active mirror placed behind the first liquid crystal panel, and configured to switch between a first state in which linearly polarized light whose polarizing direction is a first direction is transmitted, and a second state in which the linearly polarized light whose polarizing direction is the first direction is absorbed or reflected;
   an illuminating device placed between the first liquid crystal panel and the active mirror, and configured to illuminate the first liquid crystal panel; and
   a second liquid crystal panel placed behind the active mirror,
   wherein the second liquid crystal panel has a display surface which faces the active mirror, and the active mirror comprises a polarizing plate set to oppose the first liquid crystal panel and configured to absorb the linearly polarized light whose polarizing direction is a second direction that is perpendicular to the first direction, an optical sheet configured to reflect linearly polarized light whose polarizing direction is the first direction and transmit the linearly polarized light whose polarizing direction is the second direction, and a polarization conversion element placed between the polarizing plate and the optical sheet and configured to convert a polarizing direction of incident light.

2. The apparatus according to claim 1, wherein the polarization conversion element comprises a pair of opposing electrode substrates, and a TN mode liquid crystal sandwiched between the pair of electrode substrates.

3. A liquid crystal apparatus comprising:
   a first liquid crystal panel including a pair of substrates, and a dispersed liquid crystal held between the pair of substrates;
   an active mirror placed behind the first liquid crystal panel, and configured to switch between a first state in which linearly polarized light whose polarizing direction is a first direction is transmitted, and a second state in which the linearly polarized light whose polarizing direction is the first direction is absorbed or reflected;
   an illuminating device placed between the first liquid crystal panel and the active mirror, and configured to illuminate the first liquid crystal panel; and
   a second liquid crystal panel placed behind the active mirror,
   wherein the second liquid crystal panel has a display surface which faces the active mirror, and the active mirror comprises a polarization conversion element configured to convert a polarizing direction of incident light, and an optical sheet placed between the first liquid crystal panel and the polarization conversion element and configured to reflect the linearly polarized light whose polarizing direction is a second direction that is perpendicular to the first direction and transmit linearly polarized light whose polarizing direction is the first direction.

4. The apparatus according to claim 3, wherein the polarization conversion element comprises a pair of opposing electrode substrates, and a TN mode liquid crystal sandwiched between the pair of electrode substrates.

* * * * *